US011458692B2

(12) United States Patent
Hornbacher

(10) Patent No.: US 11,458,692 B2
(45) Date of Patent: Oct. 4, 2022

(54) PIPE FUSING INDICATOR ASSEMBLY

(71) Applicant: Gregory Hornbacher, Linden, MI (US)

(72) Inventor: Gregory Hornbacher, Linden, MI (US)

(*) Notice: Subject to any disclaimer, the term of this patent is extended or adjusted under 35 U.S.C. 154(b) by 287 days.

(21) Appl. No.: 16/986,709

(22) Filed: Aug. 6, 2020

(65) Prior Publication Data
US 2022/0040931 A1 Feb. 10, 2022

(51) Int. Cl.
B29C 65/00 (2006.01)
B29C 65/02 (2006.01)
G08B 5/00 (2006.01)
B29K 27/06 (2006.01)
B29L 23/00 (2006.01)

(52) U.S. Cl.
CPC .............. B29C 66/87 (2013.01); B29C 65/02 (2013.01); B29C 66/5221 (2013.01); G08B 5/00 (2013.01); B29K 2023/06 (2013.01); B29K 2027/06 (2013.01); B29L 2023/22 (2013.01)

(58) Field of Classification Search
CPC ........ B29C 65/02; B29C 65/18; B29C 65/20; B29C 65/7802; B29C 65/7841; B29C 65/7858; B29C 65/7897; B29C 66/5221; B29C 66/71; B29C 66/73921; B29C 66/87; B29C 66/872; B29K 2023/06; B29K 2027/06; B29L 2023/22; G08B 5/00
USPC .. 156/60, 304.1, 304.2, 308.2, 309.6, 309.9, 156/349, 378, 379, 391, 538, 539, 556; 138/155, 178; 116/173; D10/103
See application file for complete search history.

(56) References Cited

U.S. PATENT DOCUMENTS

| 2,567,777 | A | * | 9/1951 | Massino | ............... | A01K 97/125 43/17 |
| 4,154,191 | A | | 5/1979 | Black | | |
| 4,412,468 | A | | 11/1983 | Bucy | | |
| 5,843,271 | A | | 12/1998 | Andrew | | |
| 6,481,366 | B1 | * | 11/2002 | Patera | ..................... | G09F 17/00 116/173 |
| D643,321 | S | | 8/2011 | Nielsen | | |
| 9,393,739 | B2 | | 7/2016 | Perrault | | |
| 9,458,949 | B2 | | 10/2016 | McKinley | | |
| 10,443,772 | B2 | | 10/2019 | Kishi | | |
| 2020/0111333 | A1 | * | 4/2020 | Liivik | ....................... | G08B 5/00 |

FOREIGN PATENT DOCUMENTS

WO   WO2012018911   2/2012

* cited by examiner

Primary Examiner — Philip C Tucker
Assistant Examiner — Brian R Slawski

(57) ABSTRACT

A pipe fusing indicator assembly includes a clamp that is releasably attachable to a cylinder of a pipe fusing machine. An arm is coupled to and extends away from the clamp. The arm is positionable in a first position having the arm resting against a section of pipe positioned in the pipe fusing machine such that the arm is visible to a user. The arm falls off of the section of pipe into a second position when the section of pipe is pulled through the fusing machine. In this way the arm indicate to the user that the section of pipe has been fully pulled through the pipe fusing machine. A ball is coupled to the arm such that the ball is visible to the user to facilitate the user to identify if the arm is in the first position or the second position.

8 Claims, 9 Drawing Sheets

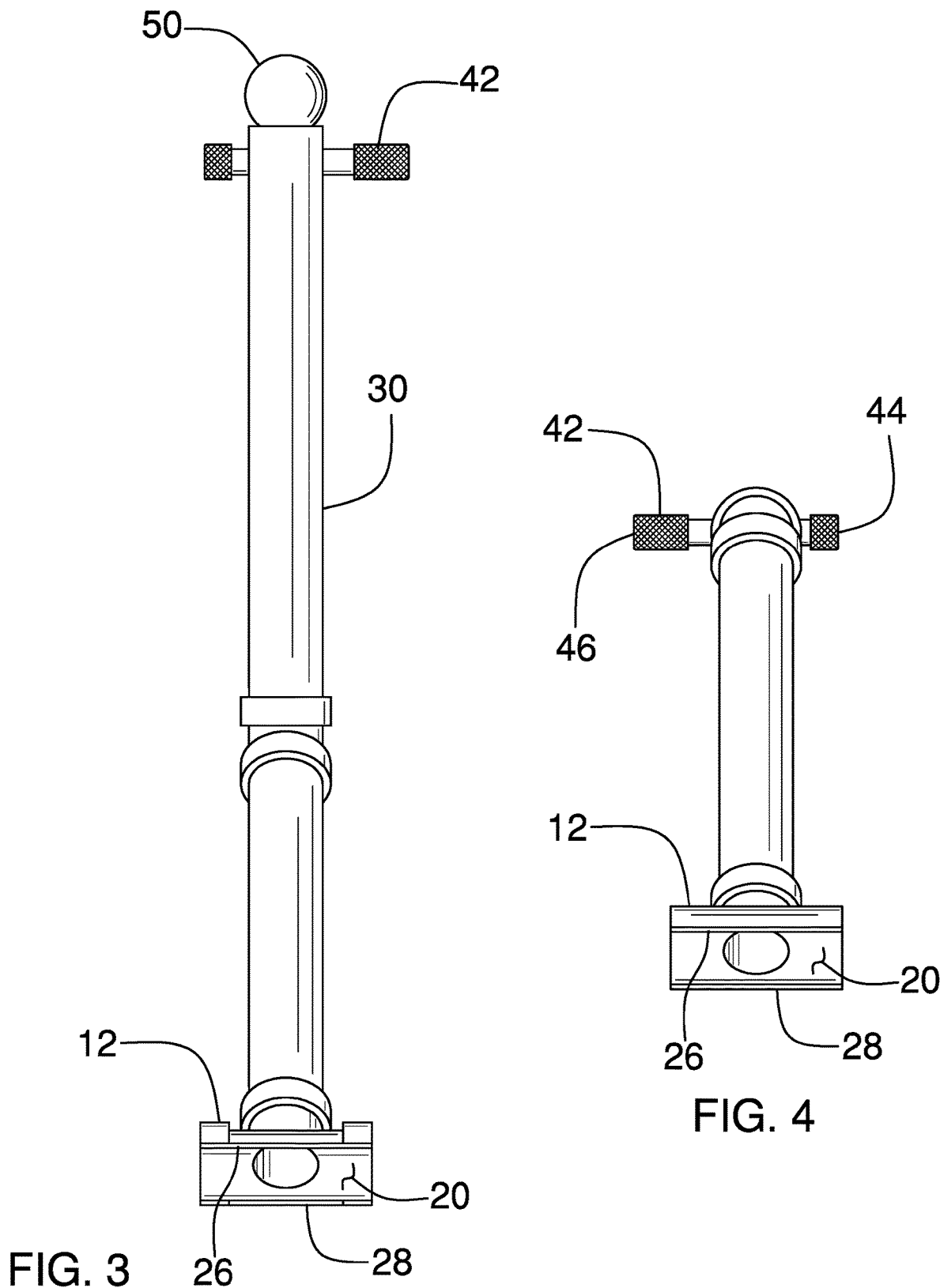

PIPE FUSING INDICATOR ASSEMBLY

(b) CROSS-REFERENCE TO RELATED APPLICATIONS

Not Applicable

(c) STATEMENT REGARDING FEDERALLY SPONSORED RESEARCH OR DEVELOPMENT

Not Applicable

(d) THE NAMES OF THE PARTIES TO A JOINT RESEARCH AGREEMENT

Not Applicable

(e) INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

(f) STATEMENT REGARDING PRIOR DISCLOSURES BY THE INVENTOR OR JOINT INVENTOR

Not Applicable

(g) BACKGROUND OF THE INVENTION

(1) Field of the Invention

The disclosure relates to indicator devices and more particularly pertains to a new indicator device for indicating when a section of pipe has been fully drawn through a pipe fusing machine.

(2) Description of Related Art Including Information Disclosed Under 37 CFR 1.97 and 1.98

The prior art relates to indicator devices including an indicator for detecting a faulty steam trap in a steam pipe. The prior art discloses a gauge for measuring lengths of board to be cut with a cross-cut saw. The prior art discloses a portable pipe fusing machine for fusing sections of pipe together. The prior art discloses a loading device for loading sections of pipe into a pipe fusing machine. Additionally, the prior art discloses a loading device for loading elongated objects. The prior art also discloses a pipe joint structure for joining sections of pipe together.

(h) BRIEF SUMMARY OF THE INVENTION

An embodiment of the disclosure meets the needs presented above by generally comprising a clamp that is releasably attachable to a cylinder of a pipe fusing machine. An arm is coupled to and extends away from the clamp. The arm is positionable in a first position having the arm resting against a section of pipe positioned in the pipe fusing machine such that the arm is visible to a user. The arm falls off of the section of pipe into a second position when the section of pipe is pulled through the fusing machine. In this way the arm indicate to the user that the section of pipe has been fully pulled through the pipe fusing machine. A ball is coupled to the arm such that the ball is visible to the user to facilitate the user to identify if the arm is in the first position or the second position.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

(i) BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

FIG. 3 is a front view of an embodiment of the disclosure.

FIG. 4 is a back view of an embodiment of the disclosure.

(j) DETAILED DESCRIPTION OF THE INVENTION

Figure 1:
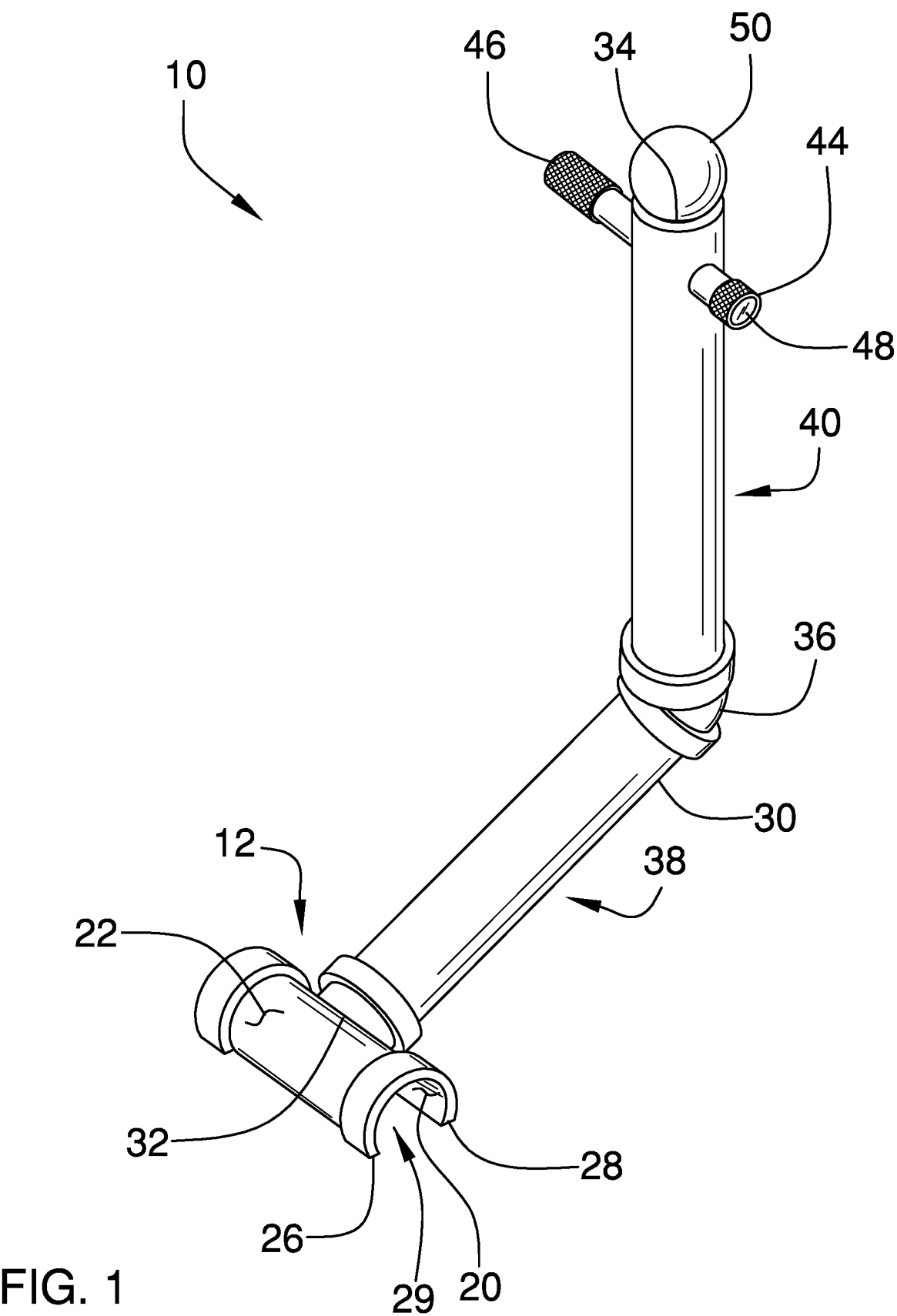
FIG. 1 is a perspective view of a pipe fusing indicator assembly according to an embodiment of the disclosure.
Figure 2:
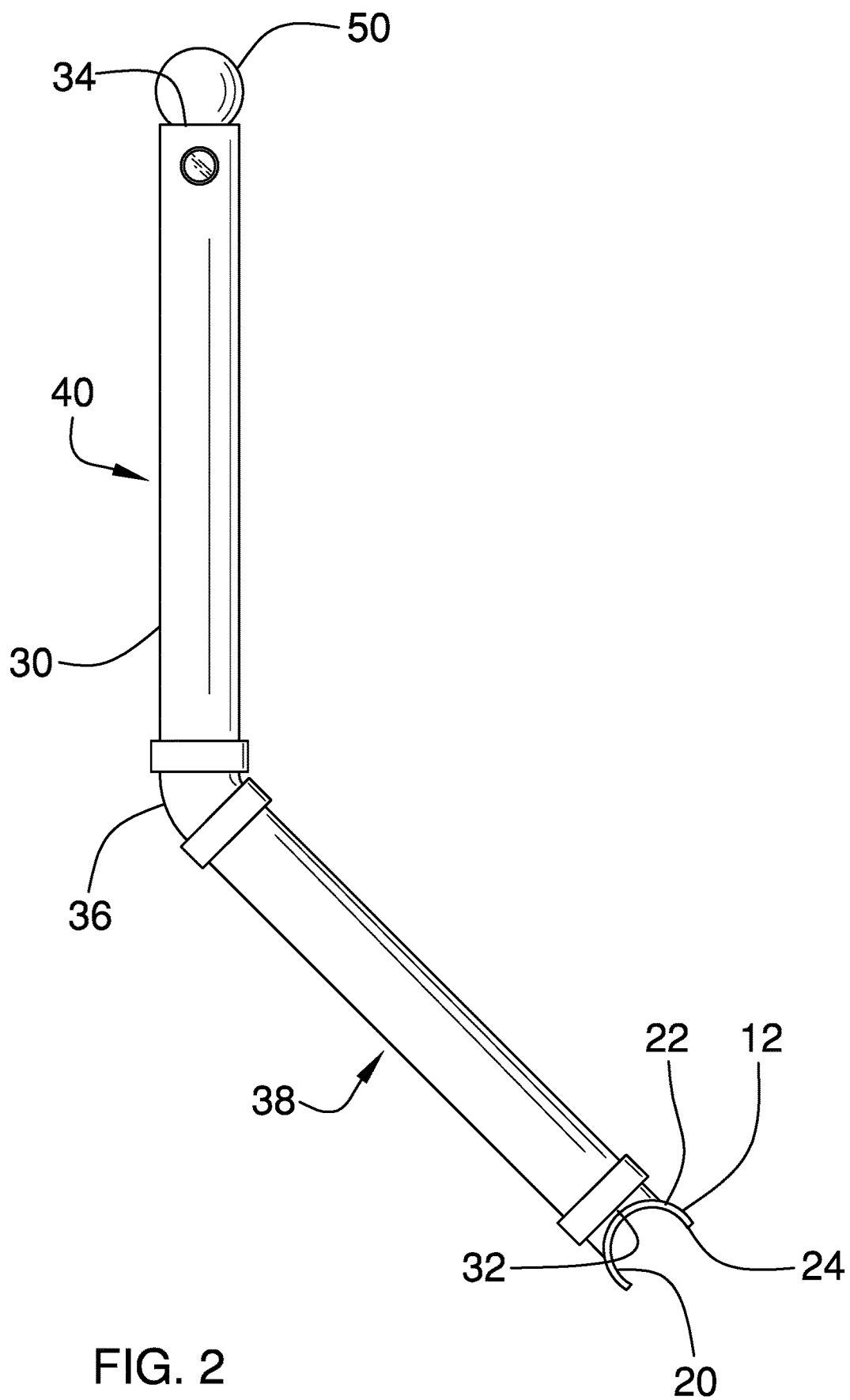
FIG. 2 is a left side view of an embodiment of the disclosure.
Figure 5:
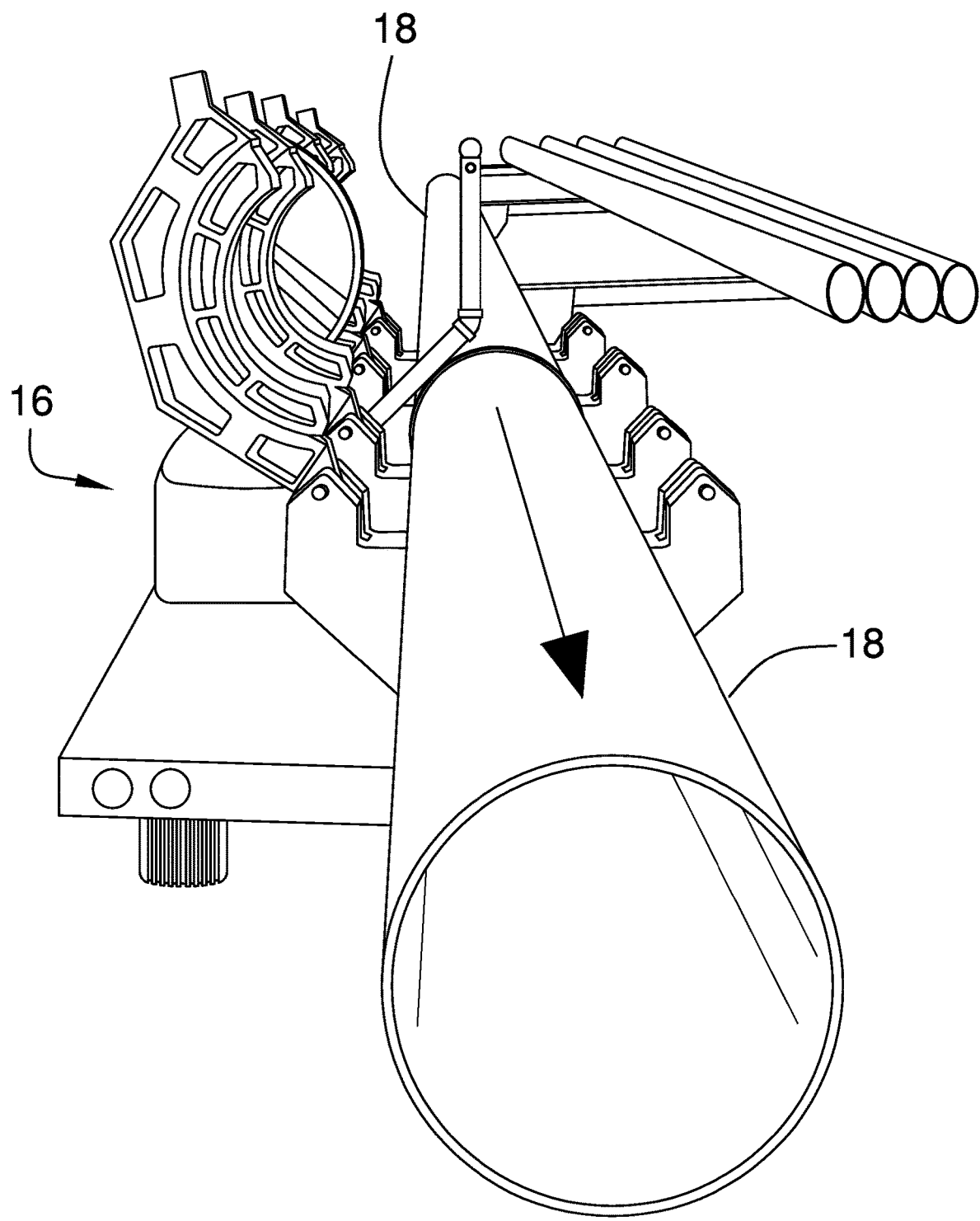
FIG. 5 is a perspective in-use view of an embodiment of the disclosure.
Figure 6:
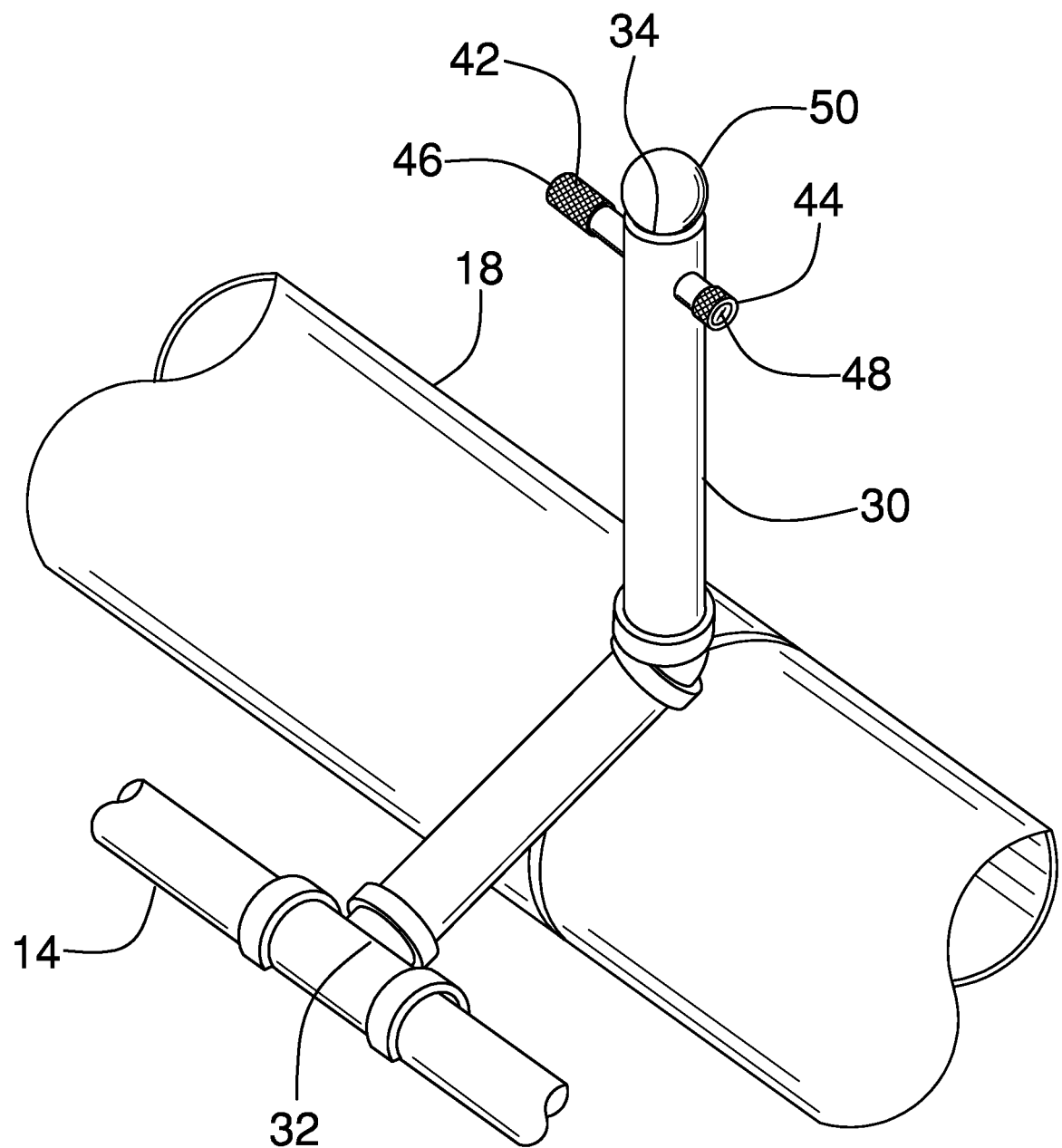
FIG. 6 is an in-use view of an embodiment of the disclosure showing an arm in a first position.
Figure 7:
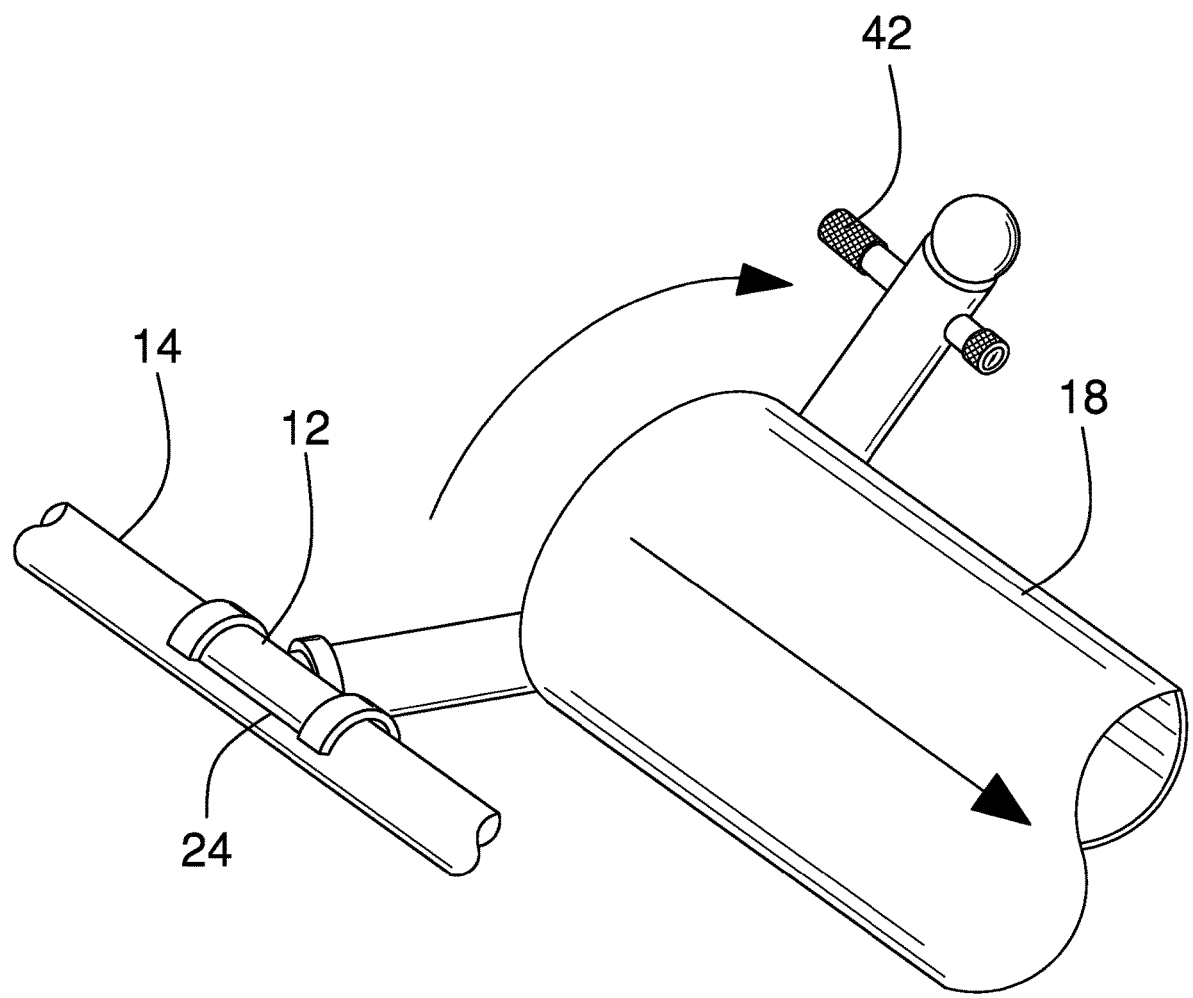
FIG. 7 is an in-use view of an embodiment of the disclosure showing an arm in a second position.
Figure 8:
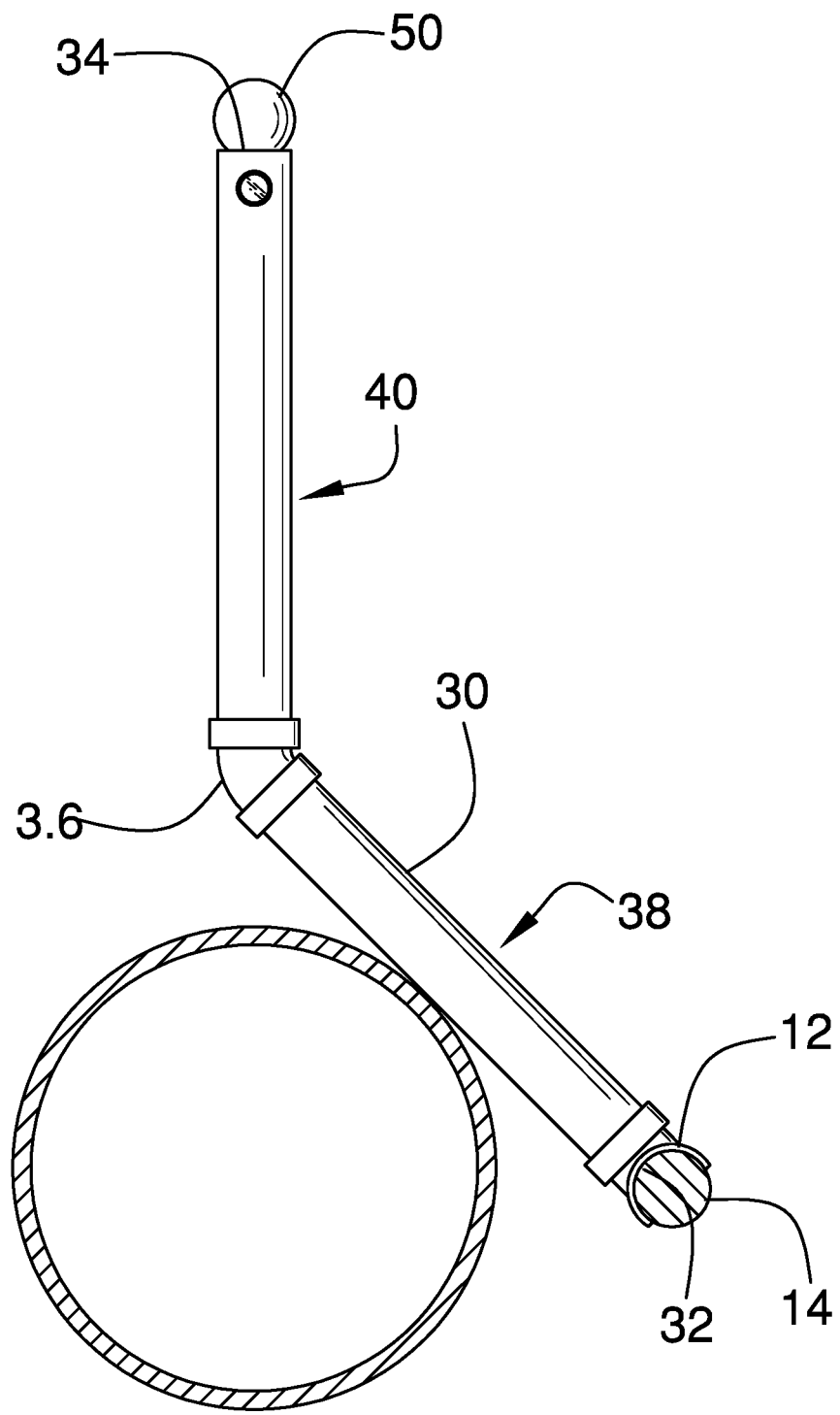
FIG. 8 is an end view of an embodiment of the disclosure.

With reference now to the drawings, and in particular to FIGS. 1 through 10 thereof, a new indicator device embodying the principles and concepts of an embodiment of the disclosure and generally designated by the reference numeral 10 will be described.

As best illustrated in FIGS. 1 through 10, the pipe fusing indicator assembly 10 generally comprises a clamp 12 that is releasably attachable to a cylinder 14 of a pipe fusing machine 16. The pipe fusing machine 16 may be a pipe fusing machine of any conventional design for joining sections of pipe 18 together. The section of pipe 18 that is being fused in the pipe fusing machine 16 may comprise a polyethylene pipe of a fusible polyvinylchloride pipe. The clamp 12 has a first surface 20, a second surface 22 and a perimeter edge 24 extending therebetween, and the perimeter edge 24 has a first lateral side 26 and a second lateral side 28. The first surface 20 is concavely arcuate between the first lateral side 26 and the second lateral side 28 such that the clamp 12 forms a channel 29 having the first lateral side 26 being spaced from the second lateral side 28. In this way the first surface 20 can conform to curvature of the cylinder 14 to facilitate the clamp 12 to be rotatable on the cylinder 14.

An arm 30 is provided and the arm 30 is coupled to and extends away from the clamp 12. The arm 30 is positionable in a first position having the arm 30 resting against a section of pipe 18 positioned in the pipe fusing machine 16. In this way the arm 30 is visible to a user that is operating the pipe fusing machine 16 by themselves. The arm 30 falls off of the section of pipe 18 into a second position when the pipe is pulled through the fusing machine 16. In this way the arm 30 can indicate to the user that the section of pipe 18 has been fully pulled through the pipe fusing machine 16.

The arm 30 has a first end 32 and a second end 34, and the arm 30 is elongated between the first end 32 and the second end 34. The first end 32 is coupled to the second surface 22 of the clamp 12 having the arm 30 being centrally positioned on the clamp 12. The arm 30 has a bend 36 thereon that is located between the first end 32 and the second end 34 to define a first portion 38 of the arm 30 forming an angle with a second portion 40 of the arm 30. The first end 32 is associated with the first portion 38 and the second end 34 is associated with the second portion 40. The arm 30 may be comprised of sections of pvc pipe or the like and the bend 36 may be a pvc elbow fitting for joining the sections of pvc pipe. Additionally, the clamp 12 may be a tee-fitting for pvc pipe that has a section removed to define the channel 29.

The first portion 38 rests against the section of pipe 18 having the second portion 40 being vertically oriented. In this way the second portion 40 can indicate to the user that the section of pipe 18 is still in the pipe fusing machine 16. The first portion 38 falls downwardly when the section of pipe 18 is pulled through the pipe fusing machine 16 having the second portion 40 being offset from the vertical orientation. In this way the second portion 40 can indicate to the user that the section of pipe 18 has been pulled through the pipe fusing machine 16.

A light emitter 42 is provided and the light emitter 42 is coupled to the arm 30. In this way the light emitter 42 can emit light outwardly therefrom such that the light emitter 42 is visible to the user in a darkened environment. Thus, the user can identify if the arm 30 is in the first position or the second position. The light emitter 42 has a primary end 44 and a secondary end 46, and the light emitter 42 is elongated between the primary end 44 and the secondary end 46. The primary end 44 has a lens 48 thereon to emit the light outwardly therefrom when the light emitter 42 is turned on. The light emitter 42 may comprise a flashlight or other type of light emitter.

The light emitter 42 extends through the second portion 40 of the arm 30. Additionally, the light emitter 42 is oriented to extend along a line that is oriented perpendicular to a longitudinal axis of the second portion 40 of the arm 30. The primary end 44 is pointed in the direction that the section of pipe 18 moves through the pipe fusing machine 16 such that the primary end 44 is visible to the user. The light emitter 42 is positioned adjacent to the second end 34 of the arm 30.

Figure 9:
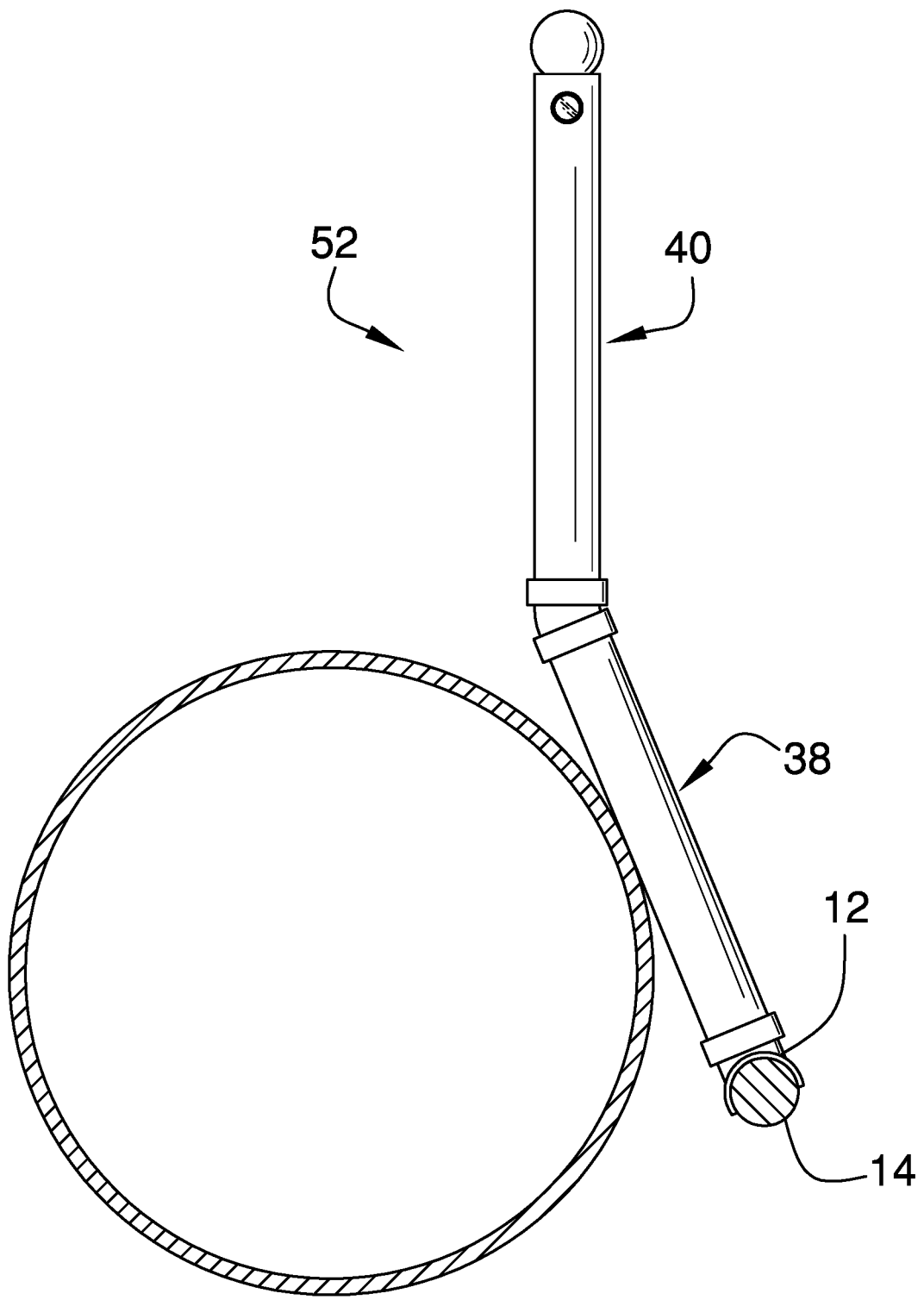
FIG. 9 is a perspective view of an alternative embodiment of the disclosure.
Figure 10:
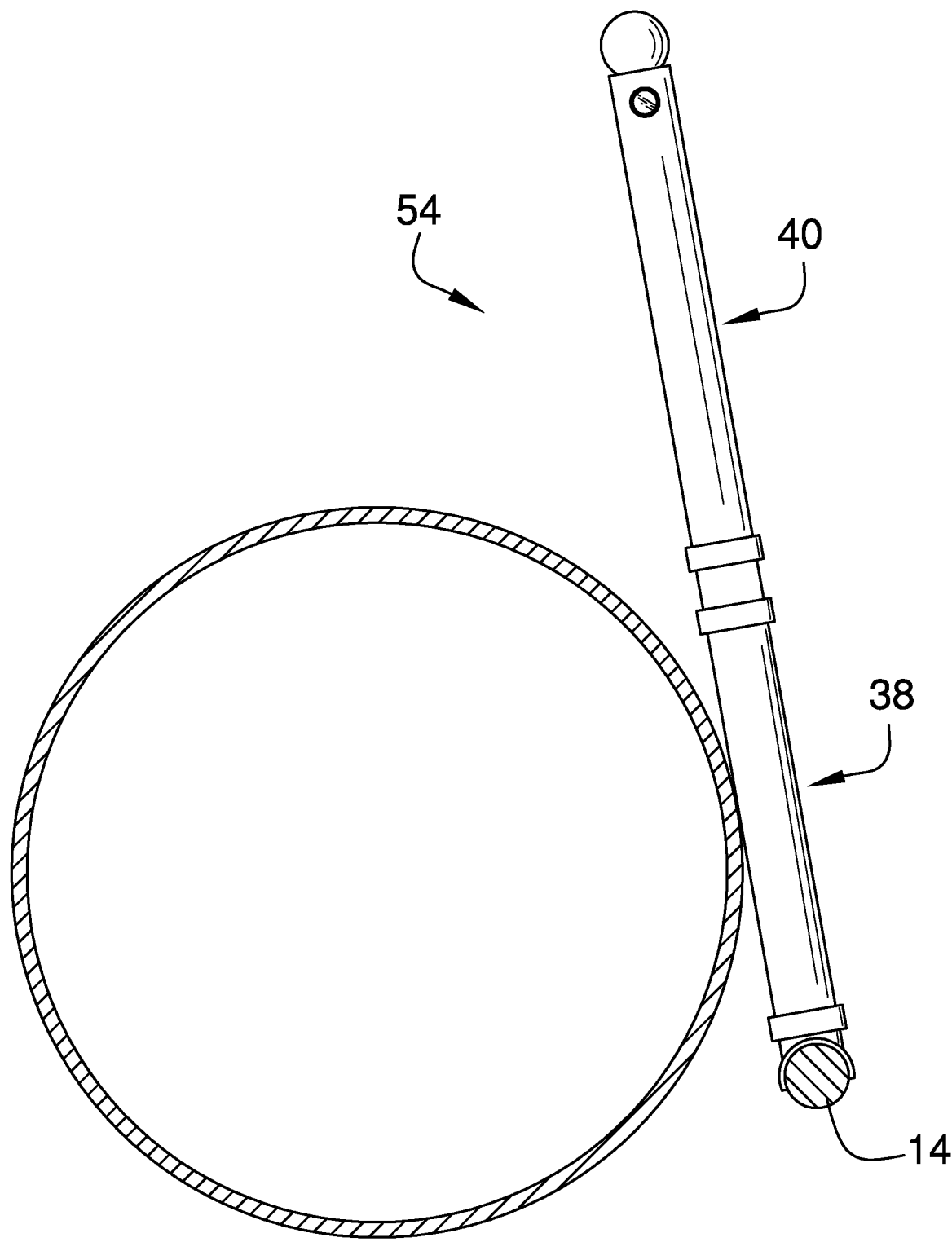
FIG. 10 is a left side view of an alternative embodiment of the disclosure.

A ball 50 is provided and the ball 50 is coupled to the arm 30 such that the ball 50 is visible to the user. In this way the ball 50 facilitates the user to identify if the arm 30 is in the first position or the second position. The ball 50 is positioned on the second end 34 of the arm 30 and the ball 50 has a color that is in contrast to a color of the arm 30. In this way the ball 50 is highly visible to the user. In an alternative embodiment 52 as is shown in FIG. 9, the second portion 40 of the arm 30 may be oriented at a shallow angle with the first portion 38 of the arm 30. In an alternative embodiment 54 as is shown in FIG. 10, the arm 30 may form a straight line.

In use, the clamp 12 is positioned on the cylinder 14 of the pipe fusing machine 16 when the user is employing the pipe fusing machine 16 to fuse sections of pipe 18. The first portion 38 of the arm 30 rests against the section of pipe 18 that is being fused in the pipe fusing machine 16. In this way the ball 50 and the light emitter 42 are visible above the section of pipe 18 alerts the user that the section of pipe 18 is still being fused. The first portion 38 falls downwardly when the section of pipe 18 moves past the arm 30. In this way the ball 50 and the light emitter 42 alerts the user that the section of pipe 18 has been pulled through the pipe fusing machine 16 and that another section of pipe 18 can be positioned in the pipe fusing machine 16 to repeat the process. In this a solo user can employ the pipe fusing machine 16 without wasting time and effort to constantly check to whether the section of pipe 18 has been fully drawn through the pipe fusing machine 16.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A pipe fusing indicator assembly for indicating to a user when a section of pipe has been fully pulled through a pipe fusing machine, said assembly comprising:
    a clamp being releasably attachable to a cylinder of the pipe fusing machine;
    an arm being coupled to and extending away from said clamp, said arm being positionable in a first position having said arm resting against the section of pipe that is positioned in the pipe fusing machine wherein said arm is configured to be visible to the user, said arm falling off of the section of pipe into a second position when the section of pipe is pulled through the pipe fusing machine wherein said arm is configured to indicate to the user that the section of pipe has been fully pulled through the pipe fusing machine;
    a light emitter being coupled to said arm wherein said light emitter is configured to emit light outwardly therefrom such that said light emitter is visible to the user in a darkened environment to facilitate the user to identify if said arm is in said first position or said second position; and a ball being coupled to said arm wherein said ball is configured to be visible to the user to facilitate the user to identify if said arm is in said first position or said second position.

2. The assembly according to claim 1, wherein said clamp has a first surface, a second surface and a perimeter edge extending therebetween, said perimeter edge having a first lateral side and a second lateral side, said first surface being concavely arcuate between said first lateral side and said second lateral side such that said clamp forms a channel having said first lateral side being spaced from said second lateral side thereby facilitating said first surface to conform to curvature of the cylinder.

3. The assembly according to claim 1, wherein said arm has a first end and a second end, said arm being elongated between said first end and said second end, said first end being coupled to a second surface of said clamp having said arm being centrally positioned on said clamp.

4. The assembly according to claim 3, wherein said arm has a bend thereon being located between said first end and said second end to define a first portion of said arm forming an angle with a second portion of said arm, said first portion having said first end being associated therewith, said second portion having said second end being associated therewith, said first portion resting against the section of pipe having said second portion in a vertical orientation wherein said second portion is configured to indicate to the user that the section of pipe is still in the pipe fusing machine, said first portion falling downwardly when the section of pipe is pulled through the pipe fusing machine having said second portion being offset from said vertical orientation wherein said second portion is configured to indicate to the user that the section of pipe has been pulled through the pipe fusing machine.

5. The assembly according to claim 3, wherein said ball is positioned on said second end of said arm, said ball having a color being in contrast to a color of said arm wherein said ball is configured to be highly visible to the user.

6. The assembly according to claim 1, wherein said light emitter has a primary end and a secondary end, said light emitter being elongated between said primary end and said secondary end, said primary end having a lens thereon wherein said primary end is configured to emit the light outwardly therefrom when said light emitter is turned on.

7. The assembly according to claim 6, wherein:
said arm has a first end and a second end, said arm having a first portion and a second portion, said second portion having said second end being associated therewith; and
said light emitter extends through said second portion of said arm having said light emitter being oriented to extend along a line being oriented perpendicular to a longitudinal axis of said second portion arm, said primary end being directed in the direction the section of pipe moves through the pipe fusing machine wherein said primary end is configured to be visible to the user, said light emitter being positioned adjacent to said second end of said arm.

8. A pipe fusing indicator assembly for indicating to a user when a section of pipe has been fully pulled through a pipe fusing machine, said assembly comprising:
a clamp being releasably attachable to a cylinder of the pipe fusing machine, said clamp having a first surface, a second surface and a perimeter edge extending therebetween, said perimeter edge having a first lateral side and a second lateral side, said first surface being concavely arcuate between said first lateral side and said second lateral side such that said clamp forms a channel having said first lateral side being spaced from said second lateral side thereby facilitating said first surface to conform to curvature of the cylinder;
an arm being coupled to and extending away from said clamp, said arm being positionable in a first position having said arm resting against the section of pipe positioned in the pipe fusing machine wherein said arm is configured to be visible to the user, said arm falling off of the section of pipe into a second position when the section of pipe is pulled through the pipe fusing machine wherein said arm is configured to indicate to the user that the section of pipe has been fully pulled through the pipe fusing machine, said arm having a first end and a second end, said arm being elongated between said first end and said second end, said first end being coupled to said second surface of said clamp having said arm being centrally positioned on said clamp, said arm having a bend thereon being located between said first end and said second end to define a first portion of said arm forming an angle with a second portion of said arm, said first portion having said first end being associated therewith, said second portion having said second end being associated therewith, said first portion resting against the section of pipe having said second portion in a vertical orientation wherein said second portion is configured to indicate to the user that the section of pipe is still in the pipe fusing machine, said first portion falling downwardly when the section of pipe is pulled through the pipe fusing machine having said second portion being offset from said vertical orientation wherein said second portion is configured to indicate to the user that the section of pipe has been pulled through the pipe fusing machine;
a light emitter being coupled to said arm wherein said light emitter is configured to emit light outwardly therefrom such that said light emitter is visible to the user in a darkened environment to facilitate the user to identify if said arm is in said first position or said second position, said light emitter having a primary end and a secondary end, said light emitter being elongated between said primary end and said secondary end, said primary end having a lens thereon wherein said primary end is configured to emit the light outwardly therefrom when said light emitter is turned on, said light emitter extending through said second portion of said arm having said light emitter being oriented to extend along a line being oriented perpendicular to a longitudinal axis of said second portion, said light emitter being positioned on said second portion of said arm, said primary end being directed in the direction the section of pipe moves through the pipe fusing machine wherein said primary end is configured to be visible to the user, said light emitter being positioned adjacent to said second end of said arm; and
a ball being coupled to said arm wherein said ball is configured to be visible to the user to facilitate the user to identify if said arm is in said first position or said second position, said ball being positioned on said second end of said arm, said ball having a color being in contrast to a color of said arm wherein said ball is configured to be highly visible to the user.

* * * * *